Jan. 3, 1939.  A. GREENBAUM  2,142,242
METHOD OF MAKING TREAD MEMBERS WITH FRICTION INSERTS
Filed Dec. 15, 1936

Witness
Paul F. Bryant

Inventor
Arthur Greenbaum
by his attorneys
Fish Hildreth Cary & Jurney

UNITED STATES PATENT OFFICE 2,142,242

METHOD OF MAKING TREAD MEMBERS WITH FRICTION INSERTS

Arthur Greenbaum, Beachmont, Mass., assignor to Panther-Panco Rubber Co., Inc., Chelsea, Mass., a corporation of Massachusetts Application December 15, 1936, Serial No. 115,981

1 Claim. (Cl. 12—146)

The present invention relates to the production of friction soles and heels of rubber compound, and is more particularly concerned with articles of this character employing an imbedded fibre which is presented in endwise relationship to the tread of the member.

It is the object of the present invention to successfully embody friction inserts within rubber soles and heels of varying characteristics in a manner to produce a satisfactory and adequate bond therebetween.

Figure 1:
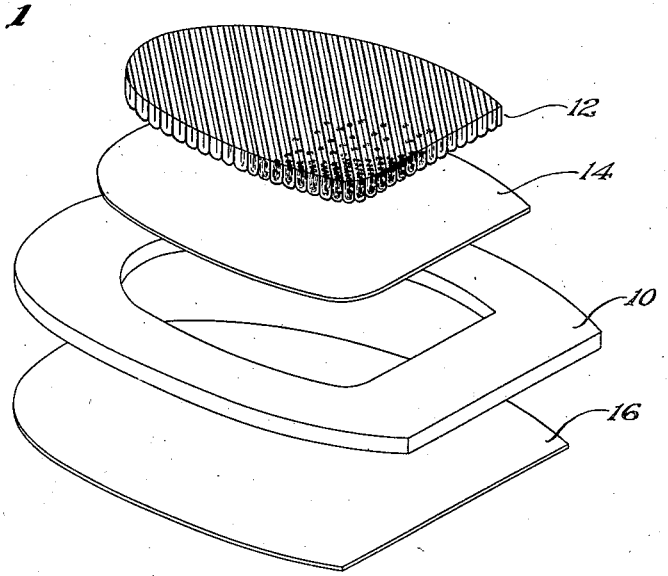
Figure 2:
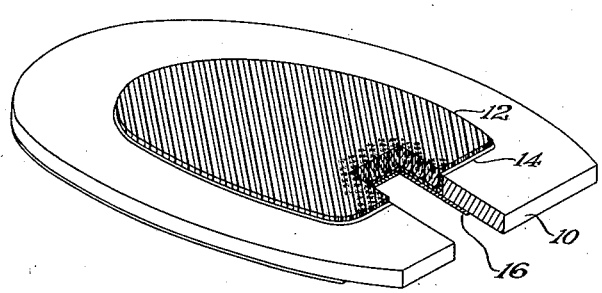

In the accompanying drawing illustrating the preferred form of the invention, Fig. 1 represents the component parts of such a sole ready for assembly; and Fig. 2 represents the assembled product ready for vulcanizing in a mold.

In the manufacture of soles and heels through the employment of pleated friction material such as shown in Quinn Patent No. 1,935,519, or its equivalent I have found that in attempting to bond such an insert to sole stock of certain dissimilar compositions normally employed for this purpose, very considerable difficulty is encountered. In fact, this difficulty is so great that the use of such an insert in other than carbon black composition soles has been heretofore considered impractical.

According to my invention, I produce an insert by first forming a sheet with parallel fibres therein, combining the sheet with gum rubber stock, pleating the combined sheet, and thereafter splitting to produce two split sheets of equal thickness. These are then dinked out into the proper form for an insert. I combine with this dinked-out insert a thin sheet of uncured carbon black rubber stock which is turned up about the edge of the insert and forms a complete insertion between the edges of the insert and the surrounding sole blank. To the bottom of the insert thus treated and the cut-out sole blank assembled therewith, I attach a sheet of rubber which on the attaching face of the finished sole completely covers the fore part of the sole including the juncture of the sole and insert.

This arrangement is clearly illustrated in the drawing, in which 10 represents the sole blank properly died out to receive the insert, the completed and died insert 12, the enveloping and bonding rubber sheet of carbon black stock 14, and the backing rubber sheet 16. After assembly the combined structure is placed in a mold in the usual manner and subjected to vulcanizing heat and pressure, care being taken that the face with the rubber overlay is put in the mold in a manner to form the attaching face of the sole, whereas the opposite face exposes the insert with the endwise projection of fibres.

What is claimed is:

The method of producing a tread member of rubber compound with a friction insert, which consists in dieing out a sole blank of rubber compound with an opening to receive the insert, preparing a friction insert of a shape and dimensions to be received within the opening, the insert comprising a fibre rubber compound with the fibres presented generally endwise to the face, assembling with the insert a sheet of carbon black rubber stock which covers one face and the marginal edge of the insert, assembling the insert with the died out sole blank with the carbon black sheet interposed between the edges of the insert and the sole blank, applying a backing sheet which covers one face of the sole blank and the carbon blank sheet, and finally subjecting the assembled article to vulcanizing heat and pressure in a mold.

ARTHUR GREENBAUM.